United States Patent
Lin et al.

(10) Patent No.: US 7,232,952 B2
(45) Date of Patent: Jun. 19, 2007

(54) BACKLIGHT MODULE AND WIRE MOUNTING ASSEMBLY THEREFOR

(75) Inventors: Wen-Hsin Lin, Jhunan Township, Miaoli County (TW); Han-Chou Liu, Hsinchu (TW); Chang-Ho Shen, Hsinchu (TW); Yu-Yan Fu, Tanzih Township, Taichung County (TW)

(73) Assignee: AU Optronics Corp., Hsinchu (TW)

( * ) Notice: Subject to any disclaimer, the term of this patent is extended or adjusted under 35 U.S.C. 154(b) by 127 days.

(21) Appl. No.: 10/937,190

(22) Filed: Sep. 9, 2004

(65) Prior Publication Data

US 2006/0013006 A1    Jan. 19, 2006

(30) Foreign Application Priority Data

Jul. 15, 2004    (TW) .............................. 93121115 A

(51) Int. Cl.
*H05K 9/00* (2006.01)

(52) U.S. Cl. .................... 174/72 A; 174/135; 248/68.1
(58) Field of Classification Search .............. 174/72 A, 174/135, 35, 360, 371, 669, 358, 650, 654, 174/664; 24/16 PB; 248/68.1; 362/396
See application file for complete search history.

(56) References Cited

U.S. PATENT DOCUMENTS 4,918,261 A * 4/1990 Takahashi et al. .......... 174/135
6,059,241 A * 5/2000 Martone ................... 248/230.1

\* cited by examiner

*Primary Examiner*—Jinhee Lee
(74) *Attorney, Agent, or Firm*—Thomas, Kayden, Horstemeyer & Risley

(57) ABSTRACT

A backlight module and wire mount assembly used therein. The assembly includes a base and a wire mount. The base includes a surface and a protrusion formed on the surface. A through hole is formed between the protrusion and the surface. The wire mount is disposed on the surface of the base in a manner such that it passes through the through hole. The wire mount serves to fix the wire.

12 Claims, 7 Drawing Sheets

BACKLIGHT MODULE AND WIRE MOUNTING ASSEMBLY THEREFOR

BACKGROUND

The invention relates to a backlight module, and in particular, to a backlight module with a wire mount deployed horizontally.

In a backlight module, wires are held by wire mounts. The wire mounts are fixed by insertion or adhesion.

FIGS. 1a and 1b show a conventional insertion-type wire mount 10 for holding wires W. The wire mount 10 is assembled on a standard surface B by vertical insertion. As shown in FIG. 1c, after vertical insertion, a protrusion 11 remains form the back of the standard surface B. The protrusion 11 may occupy space required for other devices, necessitating rearrangement of the devices, thereby complicating design.

FIG. 2a shows a conventional adhesion-type wire mount 20 for holding wires W. As shown in FIG. 2b, the wire mount 20 is fixed on a standard surface B via adhesive 21. When the wire mount 20 is separated from the standard surface B, adhesive 21 is remained so as to increase difficulty of reworking. Also, when temperature around the wire mount 20 is increased, the viscosity of the adhesive 21 is decreased.

SUMMARY

Accordingly, an embodiment of the invention provides a backlight module comprising a base, a wire, and a wire mount. The base comprises a surface and a protrusion formed on the surface. A through hole is formed between the protrusion and the surface. The wire is disposed on the surface of the base. The wire mount is disposed on the surface of the base in a manner such that the wire mount passes through the through hole to fix the wire.

Furthermore, the wire mount comprises a restraining portion and a fixed portion. The restraining portion may be a hook, and maintains the wire within a predetermined range on the surface. The fixed portion passes through the through hole so that the wire mount is fixed to the base, and comprises two locking members abutting the protrusion respectively. The locking members may be hooks, and may be elastic.

It is noted that the wire mount may be nylon.

An assembly for holding a wire is also provided. The assembly comprises a base and a wire mount. The base comprises a surface and a protrusion formed on the surface. A through hole is formed between the protrusion and the surface. The wire mount is disposed on the surface of the base in a manner such that it passes through the through hole. The wire mount serves to fix the wire.

A wire mount for holding a wire is also provided. The wire mount comprises a restraining portion and a fixed portion. The restraining portion maintains the wire within a predetermined range. The fixed portion is integrally formed with the restraining portion. The restraining portion and the fixed portion extend in opposite directions.

BRIEF DESCRIPTION OF THE DRAWINGS

The present invention can be more fully understood by reading the subsequent detailed description and examples with references made to the accompanying drawings, wherein:

FIG. 2b is a schematic view of wires held by the wire mount in FIG. 2a;

DETAILED DESCRIPTION

Figure 1B:
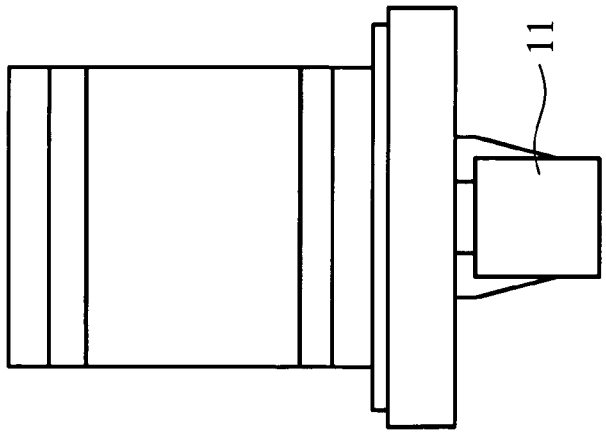
FIGS. 1a and 1b are schematic views of a conventional insertion-type wire mount.
Figure 1A:
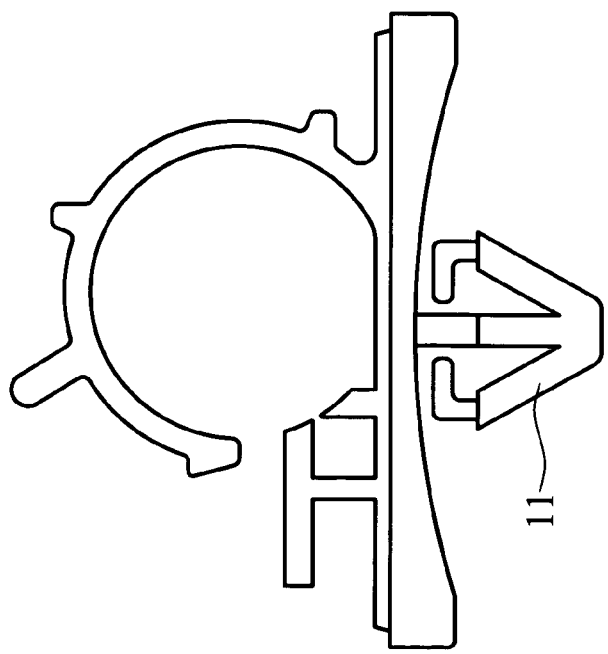
Figure 1C:
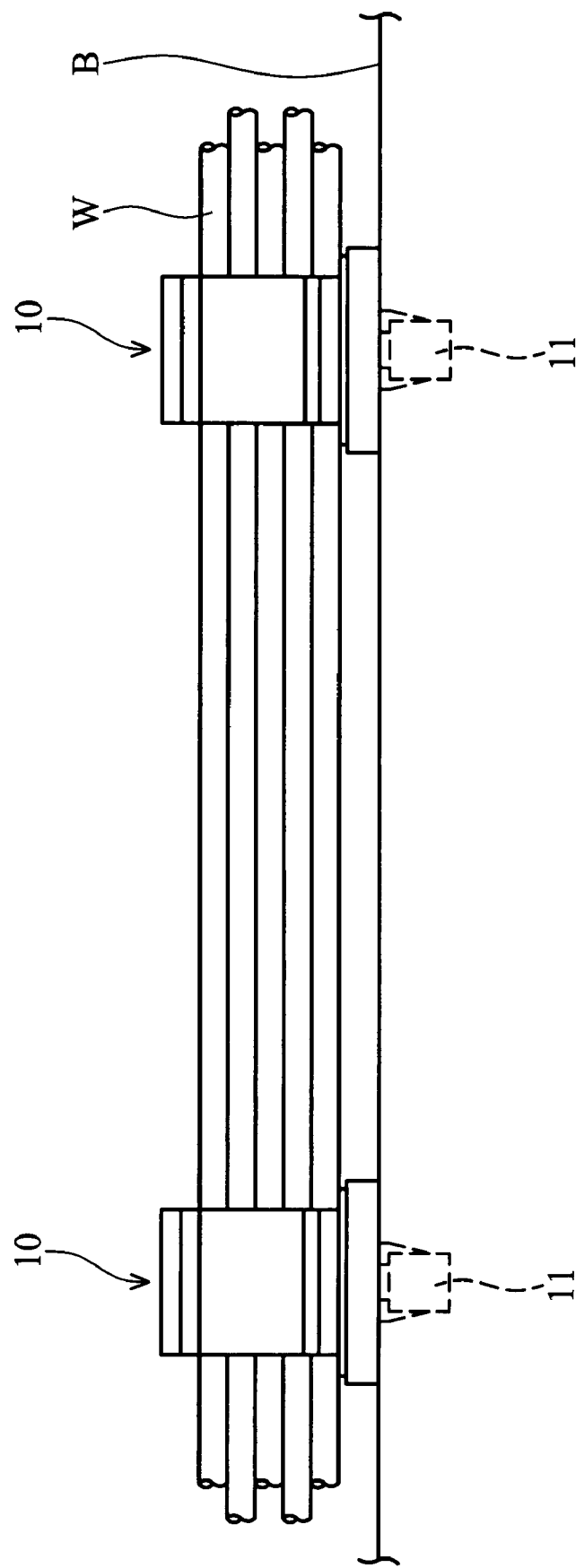
FIG. 1c is a schematic view of wires held by the wire mount in FIGS. 1a and 1b.
Figure 2A:
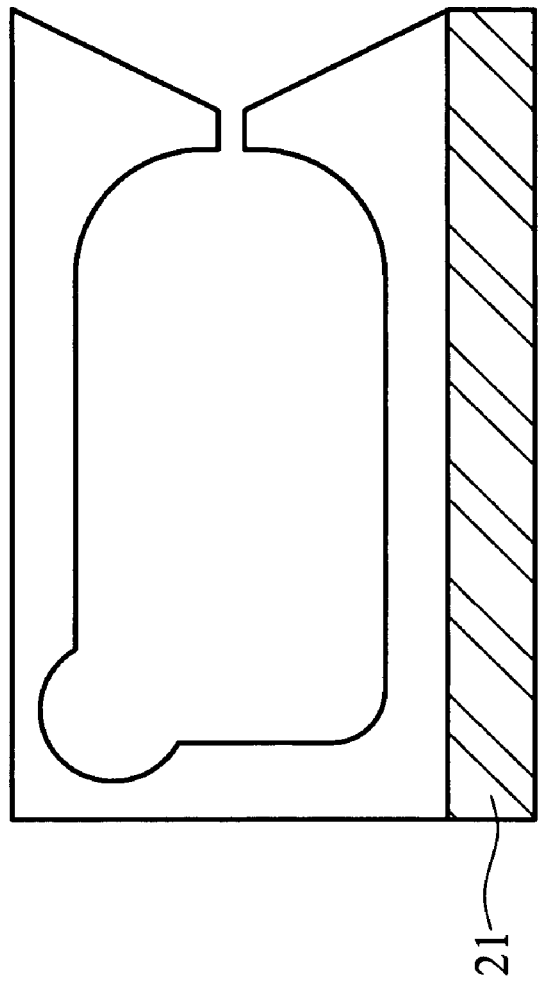
FIG. 2a is a schematic view of a conventional adhesion-type wire mount.
Figure 2B:
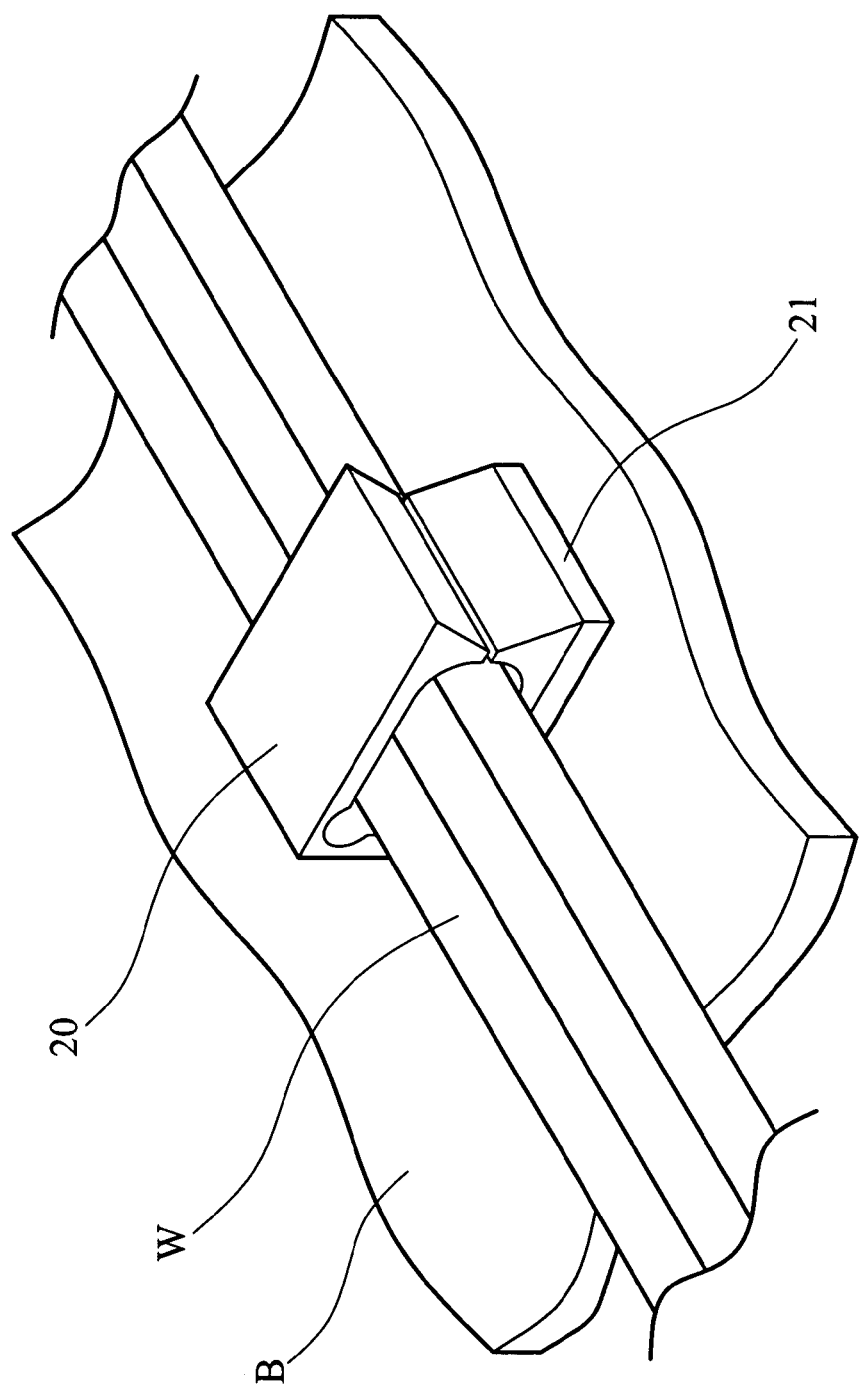
Figure 3:
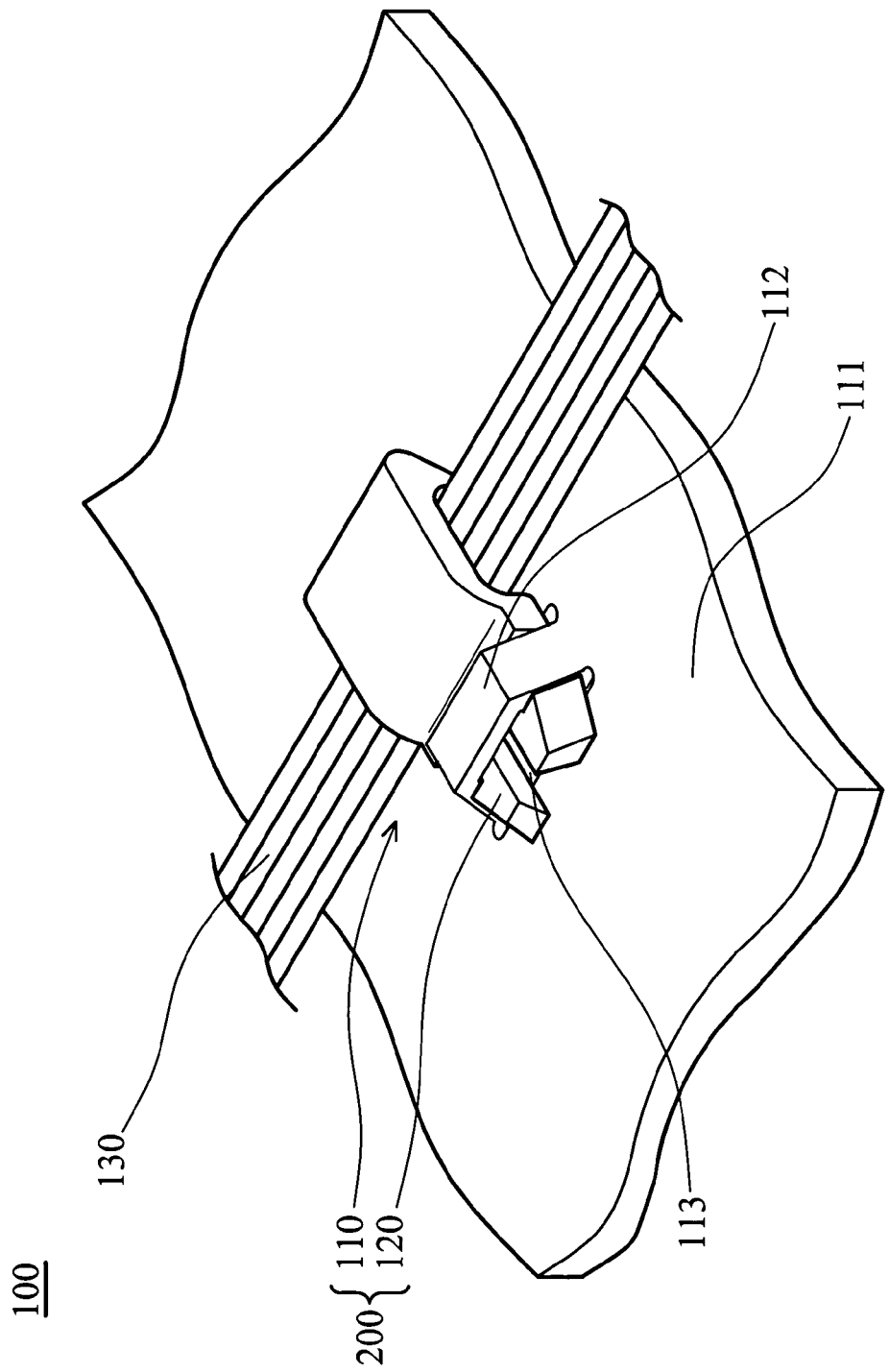
FIG. 3 is a schematic view of a backlight module as disclosed in an embodiment of the invention.

FIG. 3 shows a backlight module 100 comprising a base 110, a plurality of wires 130, and a wire mount 120. The base 110 and the wire mount 120 constitute a holding assembly 200. Additionally, it is understood that although the description of the embodiment is based on the backlight module, the holding assembly 200 and the wire mount 120 may be applied in other electronic devices wherein wires need to be fixed.

The base 110 may be a bottom plate of the backlight module 100, and comprises a surface 111 facing the exterior. A protrusion 112 is formed on the surface 111. A through hole 113 is formed between the protrusion 112 and the surface 111. While only one protrusion 113 is shown in FIG. 3 for brevity, in practice, the number of the protrusion 112 can be adjusted based on the number of the wire mount 120.

The wires 130 may be electric wires for devices, such as lamps, in the backlight module 100. Each wire 130 is disposed on the surface 111 of the base 110 via the wire mount 200, and extends along a predetermined path.

Figure 4A:
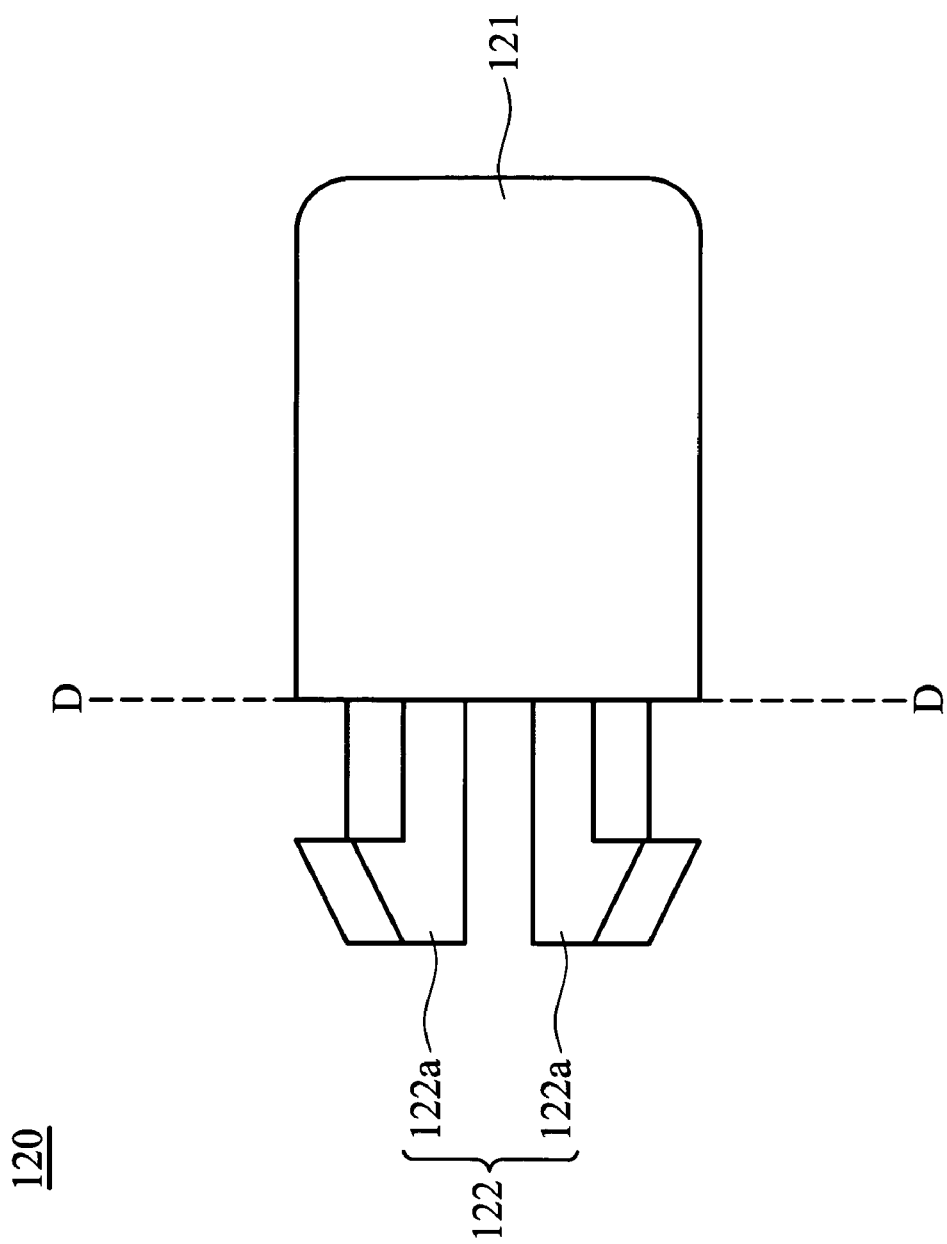
FIG. 4a is a top view of a wire mount as disclosed in an embodiment of the invention.
Figure 4C:
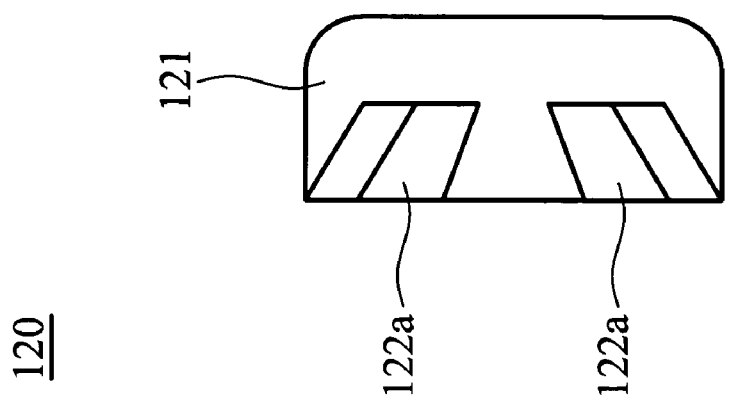
FIG. 4c is a side view of a wire mount as disclosed in an embodiment of the invention.
Figure 4B:
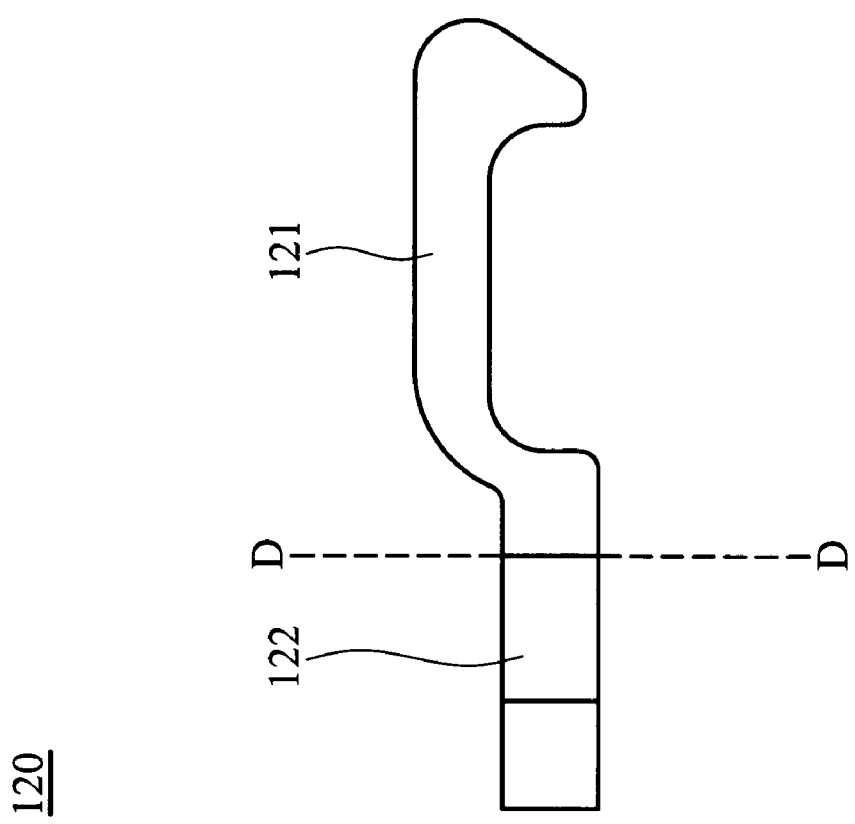
FIG. 4b is a front view of a wire mount as disclosed in an embodiment of the invention.

The wire mount 120 is disposed on the surface 111 of the base 110 such that it passes through the through hole 113 of the base 110 to fix the wires 130. As shown in FIGS. 4a~4c, the wire mount 120 comprises a restraining portion 121 and a fixed portion 122. The restraining portion 121 extends from the surface 111 and across the wire 130. The restraining portion 121 and the fixed portion 122 are integrally formed and divided by a dashed line D-D in FIGS. 4a and 4b. It is noted that the restraining portion 121 and the fixed portion 122 extend in opposite directions.

Referring to FIG. 4b, the restraining portion 121 is a hook, and maintains the wires 130 within a predetermined range on the surface 111 of the base 110 as shown in FIG. 3. Referring to FIG. 4a, the fixed portion 122 comprises two locking members 122a passing through the through hole 113 of the base 110 to abut the protrusion 112 of the base 110 respectively so that the wire mount 120 is fixed to the base 110. Additionally, each locking member 122a is a hook and is elastic, easing passage through the through hole 113 of the base 110. Furthermore, it is noted that the wire mount 120 may be plastic or nylon.

As stated above, when the wires are held via the wire mount of the embodiment, the wire mount is assembled with the base by horizontal insertion. Thus, there is no protrusion on the back of the base to affect other devices. Additionally, since there is no adhesive in the wire mount of the embodiment, there is no adhesive remained on the base after disassembly.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module comprising:
   a base comprising a surface and a protrusion formed on the surface, wherein a through hole is formed between the protrusion and the surface;
   a wire disposed on the surface of the base; and
   a wire mount disposed on the surface of the base in a manner such that the wire mount passes through the through hole to fix the wire, wherein the wire mount comprises a restraining portion extending from the surface and across the wire to maintain the wire within a predetermined range on the surface, and a fixed portion connected to the restraining portion and passing through the through hole substantially perpendicular to the wire so that the wire mount is fixed on the base.

2. The backlight module as claimed in claim 1, wherein the restraining portion is a hook.

3. The backlight module as claimed in claim 1, wherein the fixed portion comprises two locking members abutting the protrusion.

4. The backlight module as claimed in claim 3, wherein each locking member is a hook.

5. The backlight module as claimed in claim 3, wherein each locking member is elastic.

6. The backlight module as claimed in claim 1, wherein material of the wire mount comprises nylon.

7. An assembly for holding a wire, comprising:
   a base comprising a surface and a protrusion formed on the surface, wherein a through hole is formed between the protrusion and the surface; and
   a wire mount disposed on the surface of the base in a manner such that the wire mount passes through the through hole to fix the wire, wherein the wire mount comprises a restraining portion extending from the surface and across the wire to maintain the wire within a predetermined range on the surface, and a fixed portion connected to the restraining portion and passing through the through hole substantially perpendicular to the wire so that the wire mount is fixed on the base.

8. The assembly as claimed in claim 7, wherein the restraining portion is a hook.

9. The assembly as claimed in claim 7, wherein the fixed portion comprises two locking members abutting the protrusion.

10. The assembly as claimed in claim 9, wherein each locking member is a hook.

11. The assembly as claimed in claim 9, wherein each locking member is elastic.

12. The assembly as claimed in claim 7, wherein material of the wire mount comprises nylon.

\* \* \* \* \*